July 28, 1970     J. HEIDENHAIN ET AL     3,521,961
MEASURING DIVISION FOR PHOTOELECTRIC POSITION INDICATORS
Original Filed Sept. 2, 1966
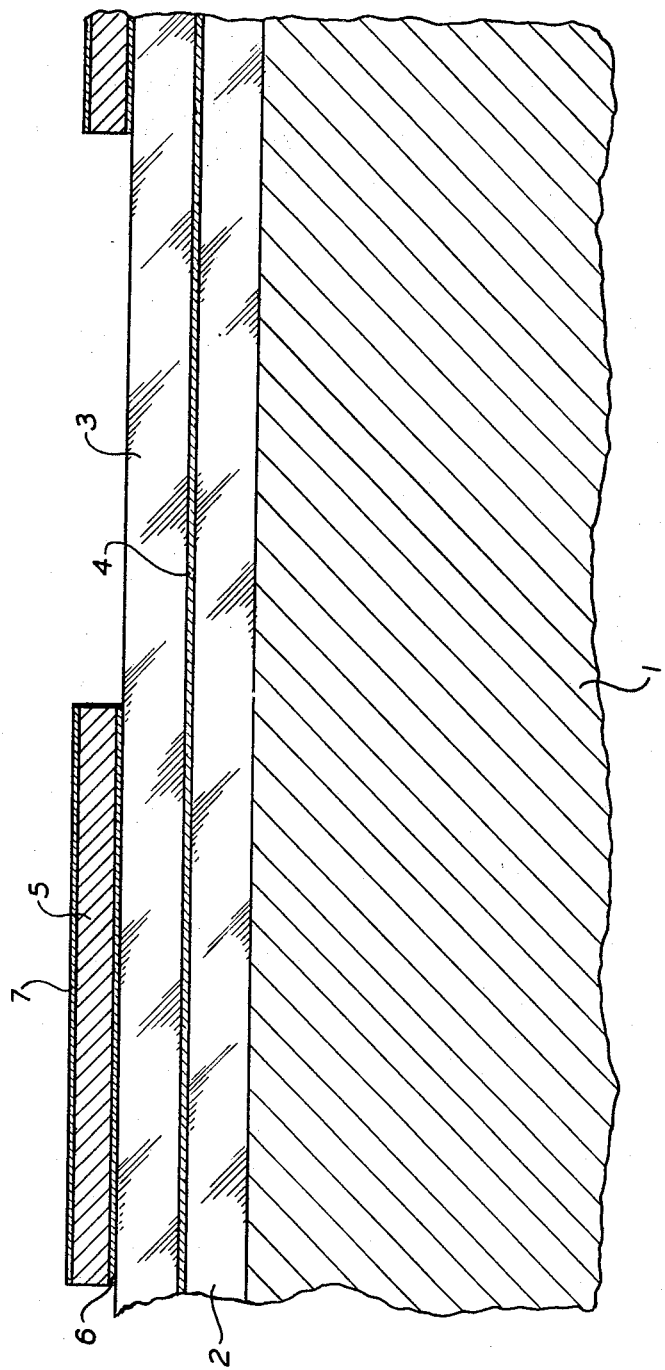
INVENTORS
JOHANNES HEIDENHAIN
ERHARD CONRATH
BY
ATTORNEY.

United States Patent Office 3,521,961
Patented July 28, 1970

3,521,961
MEASURING DIVISION FOR PHOTOELECTRIC POSITION INDICATORS
Johannes Heidenhain, Egerer, near Chieming, and Erhard Conrath, Traunreut, Germany, assignors to Dr. Johannes Heidenhain, Traunreut, near Traunstein, Germany, a corporation of Germany
Continuation of application Ser. No. 577,019, Sept. 2, 1966. This application May 27, 1969, Ser. No. 830,580
Claims priority, application Germany, Sept. 15, 1965,
W 39,912
Int. Cl. G01b *11/04*
U.S. Cl. 356—170                         8 Claims

ABSTRACT OF THE DISCLOSURE

A measuring division for photoelectric position indicators including a photoelectric element which comprises a carrier and means including at least one mark forming a reflecting metal layer and reflex-reducing interference layers supported by the carrier for increasing the contrast between the layers of the measuring division for that wavelength, for which also the photoelectric element has the maximum of its spectral sensitivity.

---

This is a continuation application to the copending patent application Ser. No. 577,019 filed Sept. 2, 1966 now abandoned.

The present invention relates to a measuring division for photoelectric position indicators with platings provided on a carrier and forming marks, which platings contrast relative to the remaining ranges of the face of the carrier.

In known measuring divisions of this type, the platings forming the marks constitute reflecting metal layers and the fields between the marks constitute light absorbing layers. Such constructed measuring divisions find their application, for instance, as optical reflection grids in devices for photoelectric position indication.

It is known to design photoelectric position indicators such, that a sensing plate formed as a transmission grid is coordinated to the optical reflection grid, said sensing plate being disposed immediately in front of the optical reflection grid, through which sensing plate the reflection grid is lit from a light source by means of an optical system and the reflected portion of the light is fed to photo-sensitive elements.

It is a presumption for the safe working of this photoelectric device, that the photoelectric element finds good contrast conditions between the reflecting marks and the absorbing fields of the measuring division.

It has been found, however, that in the known measuring divisions, the contrast between the reflecting marks and the light-absorbing fields of the measuring division is not found sufficient from the photoelectric photosensitive element with the consequence, that the exploitation of the electric signals emitted from the photo-sensitive element is more difficult and unsafe.

It is one object of the present invention to provide a measuring division of the described type, in particular in connection with such measuring divisions, in which a high edge sharpness of the mark forming platings is of essence, more favorable contrast conditions between the light and dark platings are created without loss of the edge sharpness of the mark forming platings.

It is another object of the present invention to provide measuring divisions, wherein reflecting metal layers and reflex reducing interference layers are provided in measuring divisions for photoelectric position indicating devices, in order to increase the contrast between the mentioned layers of the measuring division for that wavelength, for which also the photo-sensitive element has the maximum of its spectral sensitivity.

With these and other objects in view which will become apparent in the following detailed description, the present invention will be clearly understood in connection with the accompanying drawing, in which the only figure discloses a section through a measuring division designed in accordance with the present invention.

Referring now to the drawing, the measuring division comprises preferably a metallic base body 1, on the surface of which a layer combination capable of interferences is applied within the range of a division zone in a vapor process.

The combination of layers comprises thin dielectric layers 2 and 3 and a metal layer 4 disposed therebetween. The dielectric layers 2 and 3 consist preferably of silicon oxide and the metal layer 4 of chromium. The optical thickness of the layers 2, 3 and 4 is chosen such, that the reflection of the light is reduced on the surface of the carrier 1 by interference in the wavelength range to its minimum, in which wavelength range also the photosensitive element has a maximum of its spectral sensitivity.

The plate 5 forming the marks of the measuring division is a light-impervious metal layer applied by means of a vapor process, which metal layer has as a maximum of the spectral sensitivity of the photo-sensitive element a very high reflection degree. It is suitable to insert between the layer 4 and the plate 5 consisting, for instance, of gold, a layer 6 consisting preferably of chromium and applied in a vapor process, which layer 6 assures a good adherence of the plate 5. Furthermore, a lightpermeable layer 7 is applied to the plate 5, which layer 7 protects the plate 5 from mechanical damages. The thickness of the covering layer 7, consisting preferably of chromium, is, however, so small that the optical characteristics of the plate 5 are not changed.

A particular advantage of the measuring division designed in accordance with the present invention resides in the fact, that the layer combination 2, 3 and 4, capable of interferences and reducing the reflection, is disposed within the range of the division zone over the entire surface of the division carrier 1 and is the carrier of the mark forming reflecting metal layer 5. By this arrangement, in spite of the use of comparatively thick interference layers, a particularly sharp transfer results between the reflecting and the non-reflecting ranges.

While we have disclosed one embodiment of the present invention, it is to be understood that this embodiment is given by example only and not in a limiting sense.

We claim:
1. A measuring division for photoelectric position indicators including a photoelectric element comprising
   a carrier,
   means including at least one mark formed by a reflecting metal layer, and reflex-reducing interference layers supported by said carrier for increasing the contrast between said reflex-reducing layers of the measuring division and said reflecting metal layer for that wavelength, for which the photoelectric element has the maximum of its spectral sensitivity.

2. A measuring division for photoelectric position indicators including a photoelectric element, comprising
   a carrier,
   at least two dielectric reflex-reducing layers supported by said carrier,
   at least one metal layer disposed between said dielectric reflex-reducing layers,
   the thickness of said dielectric reflex-reducing layers being chosen such that reflection of light on the surface of said carrier is reduced to its minimum by interference within the range of wavelengths, in which the photoelectric element has the maximum of its spectral sensitivity, and a plate of light-impervious reflecting metal layer supported by the dielectric reflex-reducing layers farthest from said carrier, and forming marks of the measuring division, said reflecting metal layer and dielectric reflex-reducing layers being positioned for increasing the contrast between said reflecting metal layer and said dielectric reflex-reducing layers for that wavelength for which also said photosensitive element has the maximum of its spectral sensitivity.

3. The measuring division, as set forth in claim 2, wherein
said dielectric reflex-reducing layers consist of silicon-oxide.

4. The measuring division, as set forth in claim 2, wherein
said metal layer consists of chromium.

5. The measuring division, as set forth in claim 2, wherein
said plate of light-impervious reflecting metal comprises a gold layer applied to said dielectric reflex-reducing layers farthest from said carrier by a vapor process.

6. The measuring division, as set forth in claim 2, wherein
said dielectric reflex-reducing layers are comprised of silicon-oxide and said metal layer between said dielectric reflex-reducing layers is comprised of chromium.

7. The measuring division, as set forth in claim 6, wherein
said combination of said dielectric reflex-reducing layers and said metal layer is disposed over the entire surface of said carrier and constitutes a carrier for said plate forming said marks.

8. The measuring division, as set forth in claim 7, which includes
a chromium layer on both sides of said plate, and said chromium layers not interfering with the optical characteristics of said marks.

References Cited

UNITED STATES PATENTS

| | | |
|---|---|---|
| 2,490,662 | 12/1949 | Thomson. |
| 2,519,545 | 8/1950 | Colbert et al. |
| 2,585,128 | 2/1952 | Howe et al. |
| 2,750,832 | 6/1956 | Morgan. |
| 3,254,557 | 6/1966 | Brake et al. |
| 3,356,523 | 12/1967 | Libbery. |
| 3,369,444 | 2/1968 | Patrignani. |
| 3,371,215 | 2/1968 | Albarda. |

RONALD L. WIBERT, Primary Examiner

W. A. SKLAR, Assistant Examiner

U.S. Cl. X.R.

117—35; 250—231; 350—164, 165